(12) United States Patent
Bailey et al.

(10) Patent No.: US 8,607,536 B2
(45) Date of Patent: Dec. 17, 2013

(54) CASE FOR A DEVICE

(75) Inventors: Brent Bailey, Winter Springs, FL (US);
Clark H. Briggs, DeLand, FL (US);
Marc M. Barber, Deltona, FL (US);
Casey Keough, Dade City, FL (US);
David M. Rudd, New Port Richey, FL (US)

(73) Assignees: Faro Technologies, Inc., Lake Mary, FL (US); Gator Cases, Inc., Lutz, FL (US)

( * ) Notice: Subject to any disclaimer, the term of this patent is extended or adjusted under 35 U.S.C. 154(b) by 363 days.

(21) Appl. No.: 13/006,481

(22) Filed: Jan. 14, 2011

(65) Prior Publication Data
US 2012/0180565 A1    Jul. 19, 2012

(51) Int. Cl.
*B65B 1/04* (2006.01)

(52) U.S. Cl.
USPC ............................................................. 53/467

(58) Field of Classification Search
USPC .................. 53/467, 468; 206/316.2, 305, 521
See application file for complete search history.

(56) References Cited

U.S. PATENT DOCUMENTS

| | | | | |
|---|---|---|---|---|
| 1,535,312 A | * | 4/1925 | Hosking | 352/242 |
| 1,918,813 A | * | 7/1933 | Kinzy | 206/316.2 |
| 4,138,045 A | * | 2/1979 | Baker | 224/236 |
| 4,751,950 A | * | 6/1988 | Bock | 206/316.2 |
| 4,982,841 A | * | 1/1991 | Goedecke | 206/316.2 |
| 5,219,423 A | * | 6/1993 | Kamaya | 224/583 |
| 5,887,122 A | | 3/1999 | Terawaki et al. | |
| 5,996,790 A | * | 12/1999 | Yamada et al. | 206/316.1 |
| 6,626,339 B2 | * | 9/2003 | Gates et al. | 224/401 |
| 7,106,421 B2 | | 9/2006 | Matsuura et al. | |
| 7,120,092 B2 | | 10/2006 | del Prado Pavon et al. | |
| 7,312,862 B2 | | 12/2007 | Zumbrunn et al. | |
| 7,360,648 B1 | * | 4/2008 | Blaschke | 206/317 |
| 7,656,751 B2 | | 2/2010 | Rischar et al. | |
| 8,052,857 B2 | | 11/2011 | Townsend | |
| 8,065,861 B2 | * | 11/2011 | Caputo | 53/445 |

(Continued)

FOREIGN PATENT DOCUMENTS

| | | |
|---|---|---|
| CN | 2236119 | 9/1996 |
| CN | 2508896 | 9/2002 |

(Continued)

OTHER PUBLICATIONS

MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.

(Continued)

*Primary Examiner* — Hemant M Desai
(74) *Attorney, Agent, or Firm* — Cantor Colburn LLP

(57) ABSTRACT

A case for a device configured to couple with a mounting fixture is provided. The case includes a first housing and a second housing. The first housing and the second housing are cooperatively shaped to enclose a first portion of the device when the device is coupled to the mounting fixture. The first housing and the second housing form an opening when coupled together and expose a second portion of the device that comprises the coupling hardware for attaching the device to the mounting fixture. A third housing is removably coupled to the opening wherein the third housing is cooperatively shaped to receive the second portion of the device and enclose the device when the device is removed from the mounting fixture.

10 Claims, 14 Drawing Sheets

(56) References Cited

U.S. PATENT DOCUMENTS

| | | | |
|---|---|---|---|
| 2002/0170192 A1 | 11/2002 | Steffey et al. | |
| 2003/0142631 A1 | 7/2003 | Silvester | |
| 2006/0017720 A1 | 1/2006 | Li | |
| 2006/0169608 A1* | 8/2006 | Carnevali | 206/320 |
| 2007/0217169 A1 | 9/2007 | Yeap et al. | |
| 2007/0221522 A1* | 9/2007 | Yamada et al. | 206/316.2 |
| 2008/0245452 A1* | 10/2008 | Law et al. | 150/154 |
| 2010/0128259 A1 | 5/2010 | Bridges et al. | |
| 2010/0277747 A1 | 11/2010 | Rueb et al. | |
| 2010/0312524 A1 | 12/2010 | Siercks et al. | |
| 2011/0094908 A1* | 4/2011 | Trieu | 206/316.2 |
| 2011/0164114 A1 | 7/2011 | Kobayashi et al. | |
| 2012/0181194 A1* | 7/2012 | McEwan et al. | 206/223 |
| 2012/0210678 A1* | 8/2012 | Alcouloumre et al. | 53/467 |
| 2012/0260611 A1* | 10/2012 | Jones | 53/468 |
| 2013/0062243 A1* | 3/2013 | Chang et al. | 206/525 |

FOREIGN PATENT DOCUMENTS

| | | |
|---|---|---|
| CN | 2665668 | 12/2004 |
| CN | 1818537 | 8/2006 |
| CN | 201266071 | 7/2009 |
| DE | 102009001894 | 9/2010 |
| EP | 2400261 | 12/2011 |
| GB | 2255648 A | 11/1992 |
| JP | 2006241833 | 9/2006 |
| WO | 2009149740 A1 | 12/2009 |

OTHER PUBLICATIONS

Examination Report for German Application No. 11 2011 100 290.4 Report dated Jul. 16, 2013; based on PCT/US2011/021247.

International Search Report for International Application No. PCT/US/2013/041826 filed May 20, 2013; mailed Jul. 29, 2013.

International Search Report for International Application No. PCT/US2013/040309 mailed Jul. 15, 2013.

International Search Report for International Application No. PCT/US2013/040321 mailed Jul. 15, 2013.

International Search Report of the International Searching Authority for Application No. PCT/US2013/022186; Date of Mailing: May 29, 2013.

Written Opinion for International Application No. PCT/US/2013/041826 filed May 20, 2013; mailed Jul. 29, 2013.

Written Opinion for International Application No. PCT/US2013/040309 mailed Jul. 15, 2013.

Written Opinion of the International Searching Authority for Application No. PCT/US2013/022186; Date of Mailing: May 29, 2013.

Written Opinion for International Application No. PCT/US2013/040321 mailed Jul. 15, 2013.

International Search Report for International Application No. PCT/US2011/021248 mailed Sep. 19, 2011.

Written Opinion of the International Searching Authority for International Application No. PCT/US2011/021248 mailed Sep. 19, 2011.

Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE, Published Feb. 9, 2011.

P Ben-Tzvi, et al "Extraction of 3D Images Using Pitch-Actuated 2D Laser Range Finder for Robotic Vision" (6 pages) BNSDOCID <XP 31840390A_1_>, Published Oct. 15, 2010.

YK Cho, et al. "Light-weight 3D LADAR System for Construction Robotic Operations" (pp. 237-244); 26th International Symposium on Automation and Robotics in Construction (ISARC 2009), Published Jun. 24, 2009.

Romer "Romer Measuring Arms Portable CMMs for R&D and shop floor" (Mar. 2009) Hexagon Metrology (16 pages), Published Mar. 2009.

\* cited by examiner

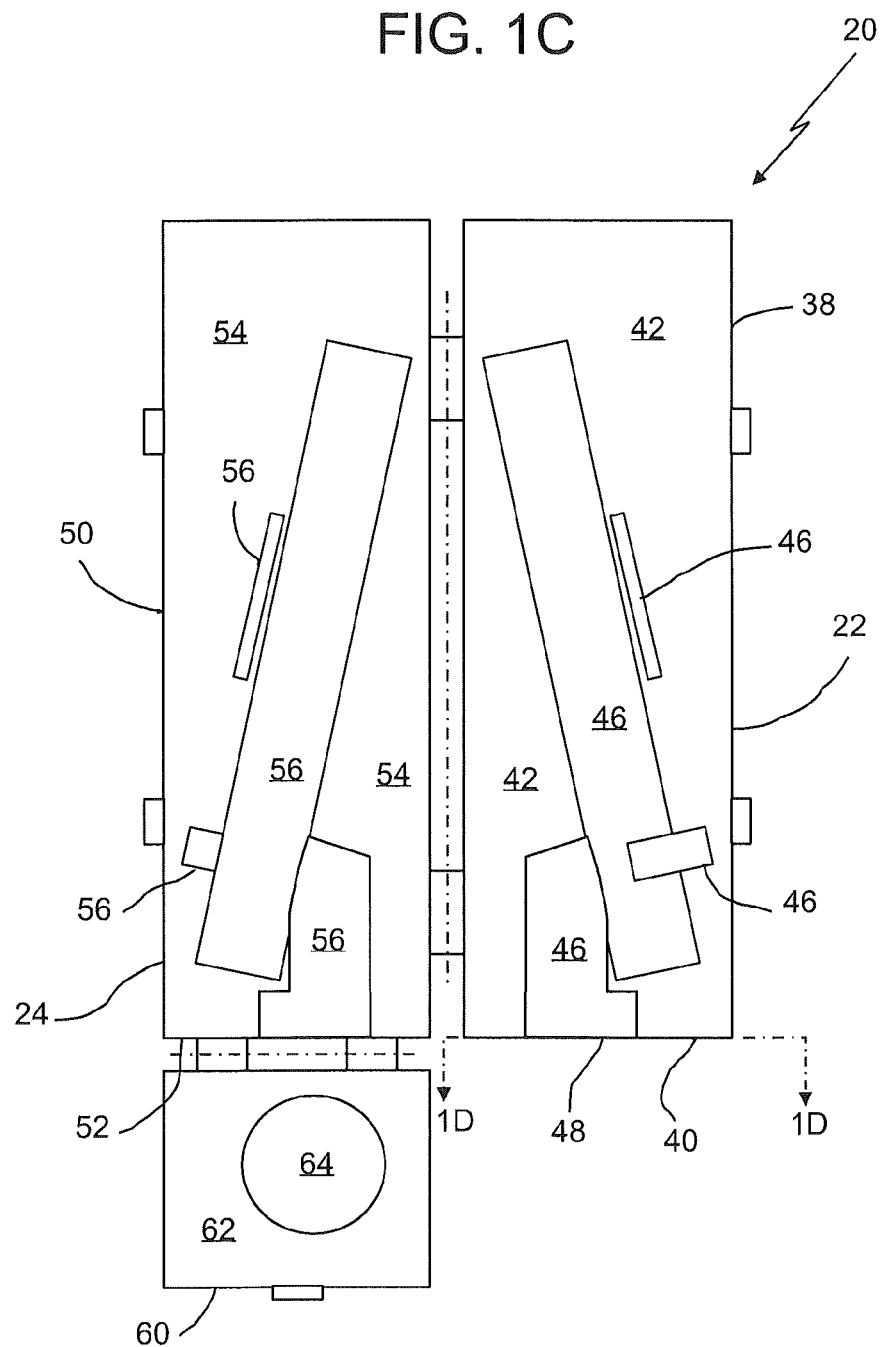

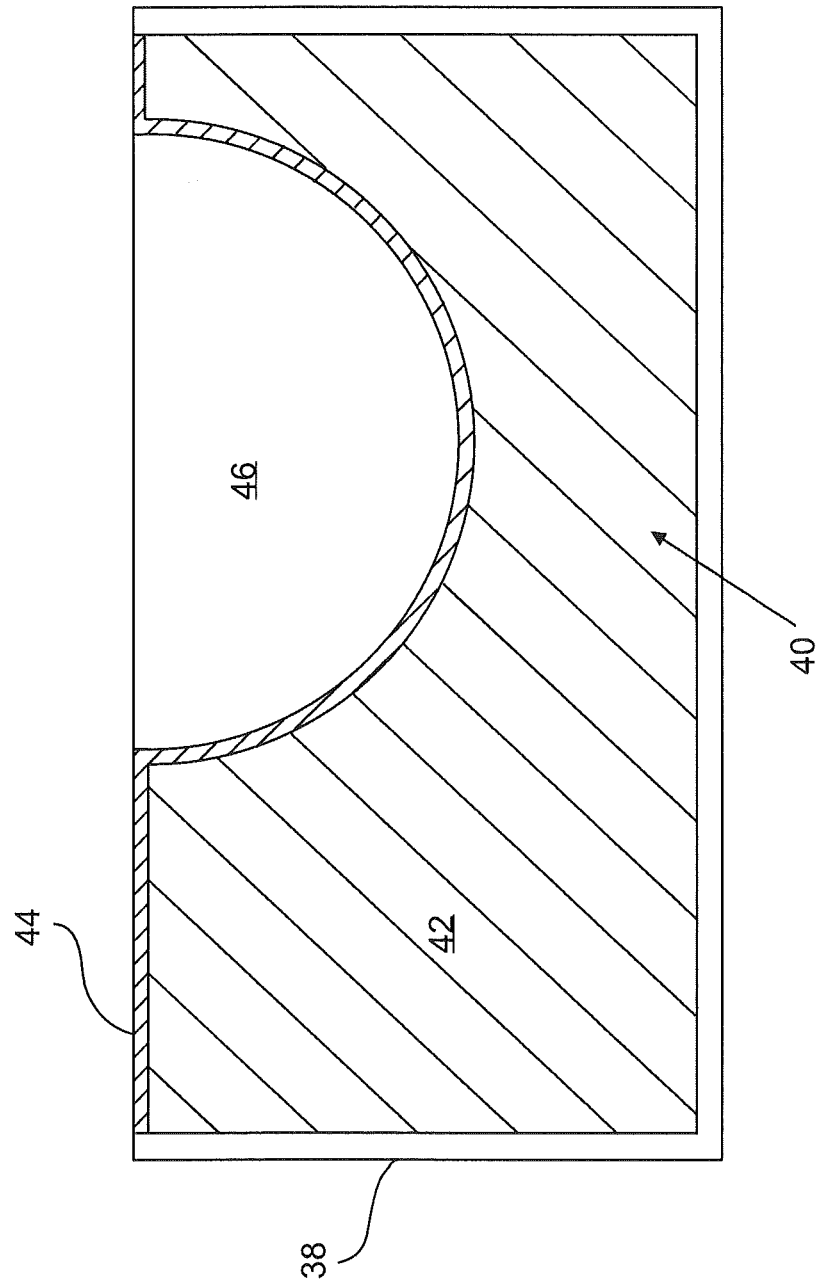

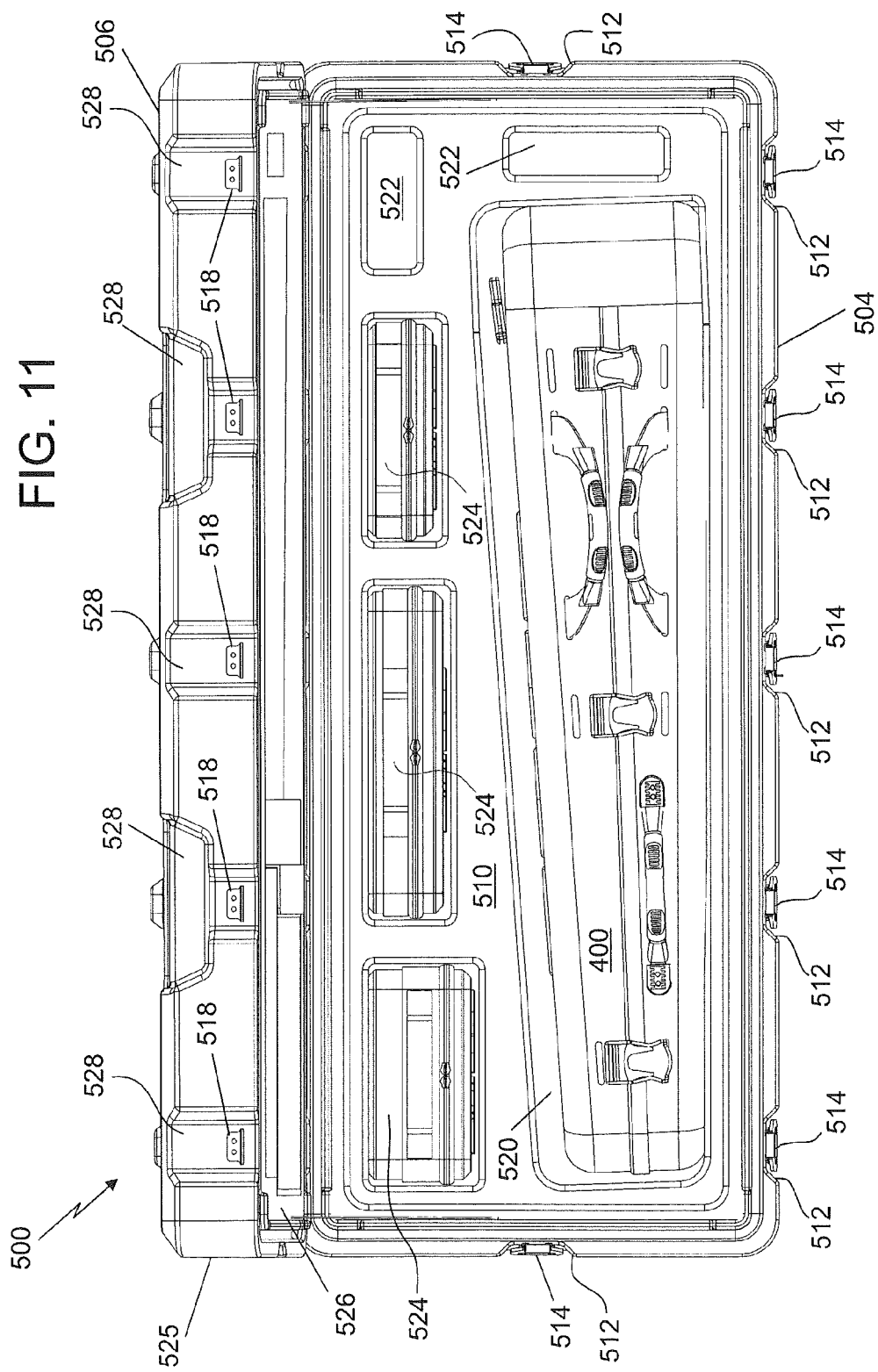

CASE FOR A DEVICE

BACKGROUND

The present disclosure relates to a case for a device, and more particularly to a case for a device that is typically mounted upon a stand or mounting fixture during use, which allows the operator to store the device within the case prior to removing the device from a mounting fixture, and also allows the operator to mount the device to a fixture before removing the device from the case.

Instruments and other devices are commonly stored in cases or housings when not in use or during transportation. The case provides a means for protecting the device to avoid inadvertent damage. In instances where the device is awkwardly shaped, or bulky, the case may also provide a more convenient method of transporting the device rather than simply carrying the device alone. A case typically includes a hard or soft outer layer that protects the device from impact and a softer inner layer or member that protects the device from shock loads.

In some applications, the device may be mounted to a fixture during use. For example, a portable telescope or camera may be mounted to a tripod. In other cases, the fixture may be stationary such as a fixture in a machining center or at an inspection station in a manufacturing environment. Since the fixture and the device are not a single integral unit, the device needs to be removed from the case and moved some distance by the operator before being mounted at the point of use. During this period between removal from the case and mounting to the fixture, the device may be exposed to damage and other undesirable conditions. In the case of an awkward or bulky device, the mounting of the device to the fixture may be made difficult after removal from the case by the size or configuration of the device.

Accordingly, while existing cases for devices are suitable for their intended purposes, the need for improvement remains. What is needed is a device case having the features described herein.

SUMMARY OF THE INVENTION

In accordance with one embodiment of the invention, a case for a device configured to couple with a mounting fixture is provided. The case includes a first housing and a second housing. The first housing and the second housing are cooperatively shaped to couple together and enclose a first portion of the device when the device is coupled to the mounting fixture. The first housing and the second housing further form an opening when coupled exposing a second portion of the device that comprises the coupling hardware for attaching the device to the mounting fixture. A third housing is removably coupled to the opening wherein the third housing is cooperatively shaped to receive the second portion of the device and enclose the device when the device is removed from the mounting fixture.

In accordance with another embodiment of the invention, another case for a device is provided. The case is configured to at least partially enclose the device while the device is in a mounting fixture. The case includes an inner case having a first housing rotationally coupled to a second housing. The inner case includes a third housing rotationally coupled to one end of the second housing, wherein the first housing and the second housing cooperate to enclose a first portion of the device when coupled to the mounting fixture. The third housing cooperates with the first housing and the second housing to enclose a second portion of the device when the device is removed from the mounting fixture. An outer case is provided having a base member with a first opening sized to receive the inner case. The outer case further includes a lid member rotationally coupled along one side of the base member, wherein the base member and the lid member cooperate to enclose the inner case when the lid member is rotated into contact with the base member.

In accordance with yet another embodiment of the invention, another case for a device configured to couple with a mounting fixture is provided. The case includes a first housing having a first outer shell and a first side, the first outer shell having an open end. A second housing is provided having a second outer shell and a second side, the second outer shell having an open end. The second housing is rotationally coupled to the first housing about a first axis, wherein the first side and the second side cooperate to enclose a first portion of the device when the device is coupled to the mounting fixture. A third housing is movably coupled to the second housing, the third housing having a third recess sized to receive a second portion of the device on a third side. The third housing encloses the device when the third side is moved into contact with the first housing and the second housing and the device is removed from the mounting fixture.

In accordance with another embodiment of the invention, a method of transporting a device is provided. The method includes providing the device coupled to a mounting fixture. A first case is provided with a first housing rotationally coupled to a second housing, the first case further having a third housing rotationally coupled to an end. The first housing is rotated about a first axis relative to the second housing from a first position to a second position. The third housing is rotated about a second axis substantially perpendicular to the first axis from a third position to a fourth position. A first portion of the device is placed into the second housing. The first housing is rotated from the second position to the first position to enclose the first portion of the device. The device is decoupled from the mounting fixture when the first portion of the device is enclosed by the first housing and the second housing.

In accordance with yet another embodiment of the invention, another method of transporting a device is provided. The method includes providing the device enclosed in a first case, the first case having a first housing rotationally coupled to a second housing, the first case further having a third housing movably coupled to an end. The third housing is moved to expose a first portion of the device. The first portion of the device is coupled to a mounting fixture. The first housing is rotated about a first axis relative to the second housing from a first position to a second position, wherein a second portion of the device is exposed when the first housing is in the second position. The second housing is removed from the second portion of the device.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including FIGS. 1A-1D, are views of a case for a device having embodiments of various aspects of the present invention therewithin;

FIG. 2, including

FIG. 11 is a top view of the case arrangement of FIG. 10.

DETAILED DESCRIPTION

Figure 1A:
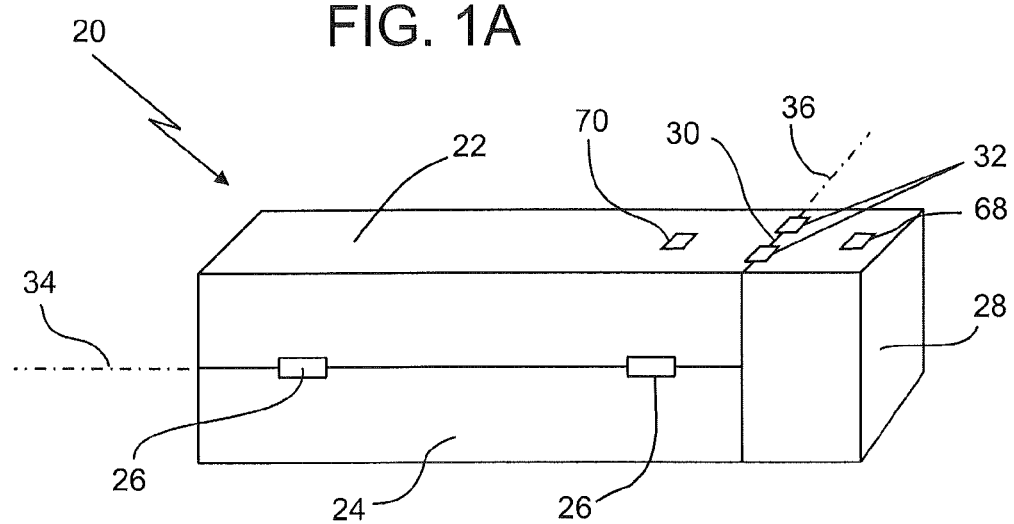
Figure 1B:
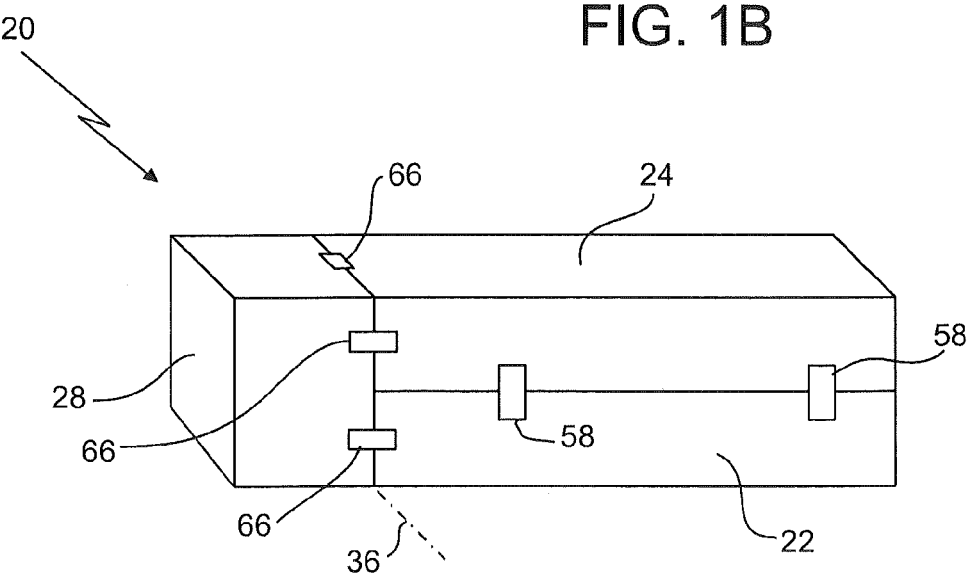

Embodiments of the present invention provide advantages in the protection and transportation of a device. In one embodiment, a case is provided that provides advantages in allowing the operator to arrange the device in the case prior to decoupling the device from a mounting fixture. In another embodiment, multiple cases are provided that cooperate to facilitate transportation of the device during different applications, such as when the device is being shipped by a transportation entity versus being hand-carried by an operator.

FIGS. 1A-1D illustrate a case 20 for protecting and transporting a device according to various embodiments of the present invention. The case 20 may be used for devices that are mounted to a fixture, such as but not limited to a tripod or a surface mounting plate for example. The case 20 may be configured to enclose a device such as but not limited to a telescope, a camera, a video camera or a metrology instrument for example. The case includes a first housing 22 rotationally coupled to a second housing 24 along an edge by one or more hinges 26. A third housing 28 is arranged at one end of the case 20 and is rotationally coupled to the second housing 24 along an edge 30 by one or more hinges 32. The first housing 22 and second housing 24 are arranged to rotate about a first axis 34, while the third housing 28 is arranged to rotate relative to the second housing 24 about a second axis 36. In the exemplary embodiment, the second axis 36 is substantially perpendicular to the first axis 34.

The first housing includes a shell 38 that is substantially open on one end 40. In the exemplary embodiment, the shell 38 is made from a waterproof material, such as a polyurethane fabric material for example. The shell 38 defines an interior region sized to receive an insert member 42. The insert member 42 substantially fills the interior of shell 38 and may be made from an open cell or a closed cell polyurethane foam material for example. The insert member 42 forms one face or side of the first housing 22 and is disposed adjacent the second housing 24 when the case 20 is in a closed position. In one embodiment, the insert member 42 may have a fabric liner 44 (FIG. 1D) that is made from an electrostatic-discharge (ESD) safe material. The insert 42 may include one or more recesses 46 that are sized, shaped and contoured to receive the device such that the device is retained in a substantially nonmovable position within the recess 46 when the case 20 is in a closed position. As will be discussed in more detail herein, the recess 46 forms an opening 48 adjacent the open end 40 that allows a portion of the device to extend beyond the end of the first housing 22 when the first housing 22 and second housing 24 are in the closed position. In one embodiment, the insert member 42 is compressible such that the recess 46 is smaller than the device to be retained and the insert member 42 compresses when the case 20 is closed such that the insert member 42 substantially conforms to the outer surface of the device.

The second housing 24 is constructed similarly to the first housing 22. The second housing 24 includes a shell 50 with a substantially open end 52. An insert member 54 having one or more recesses 56 is disposed within the shell 50. The recesses 56 are sized, shaped and contoured to receive at least a portion of the device to be retained. The recess 56 may form an opening in the open end 52 that allows a portion of the device to extend beyond the end of second housing 24. The insert member 54 may be made from an open cell or closed cell foam material, such as polyurethane for example, and may also have an outer surface made from an ESD safe material.

It should be appreciated that when the first housing 22 and the second housing 24 are rotated to a closed position, the opposing sides of the inserts 42, 54 may be in contact such that a portion of the device to be retained is arranged in the recesses 46, 56 is substantially enclosed. When in the device is enclosed by the first housing 22 and the second housing 24, the device is restrained such that there is substantially no movement of the device within the case 20.

The first housing 22 and the second housing 24 may include one or more latch members 58. The latch members 58 may be any suitable retaining device that securely, reliably and releasably couples the housings 22, 24 together when the case 20 is in the closed position. In one embodiment, the latch members 58 are an over-center draw type latch. The first housing 22 and second housing 24 may further include one or more handles that facilitate the carrying of the case 20 by an operator.

The third housing 28 is constructed substantially similarly to the first housing 22 and includes a shell 60 and an insert 62. The insert member 62 includes a recess 64 that is contoured, sized and shaped to receive a portion of the device that extends from the open ends 40, 52 of the housings 22, 24. The shell 60 may be made from a waterproof material, such as a polyurethane fabric material for example and the insert member may be made from an open cell or closed cell polyurethane foam. The insert member 62 may also include a liner made from an ESD safe material. The third housing 28 is sized such that when the third housing 28 is rotated to the closed position, the third housing 28 encloses the open ends 40, 52. As will be discussed in more detail below, with the first housing 22, the second housing 24 and the third housing 28 are rotated from an open position (FIG. 1C) to a closed position (FIG. 1A-1B), the device is substantially enclosed within the case 20. It should be appreciated that the third housing 28 may be removably coupled to either the first housing 22, the second housing 24 or to another portion of the case 20 such that the third housing 28 encloses the open ends 40, 52 when in the closed position. The case 20 may also include one or more latch members 66 that couple the third housing 28 to the first housing 22 when in the closed position.

The case 20 may further include a retaining device that includes a first member 68 and a second member 70 that cooperate to retain the third housing 28 in an open position. The retaining device may be a mechanical or magnetic type retaining device. In one embodiment, the third housing 28 does not have hinges 32 and the third housing 28 is retained by latch members 66.

Figure 2A:
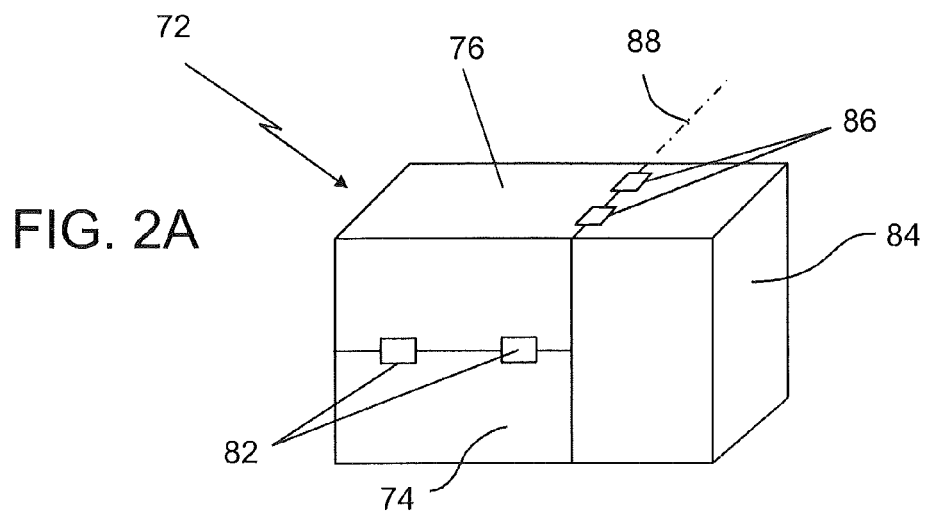
FIGS. 2A-2C, are views of a case for a device in accordance with another embodiment.
Figure 2B:
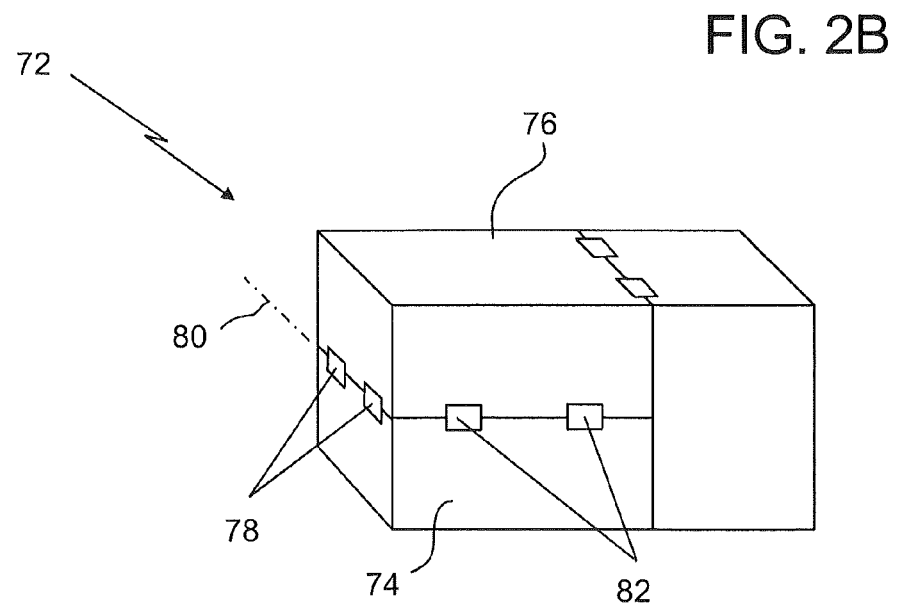
Figure 2C:
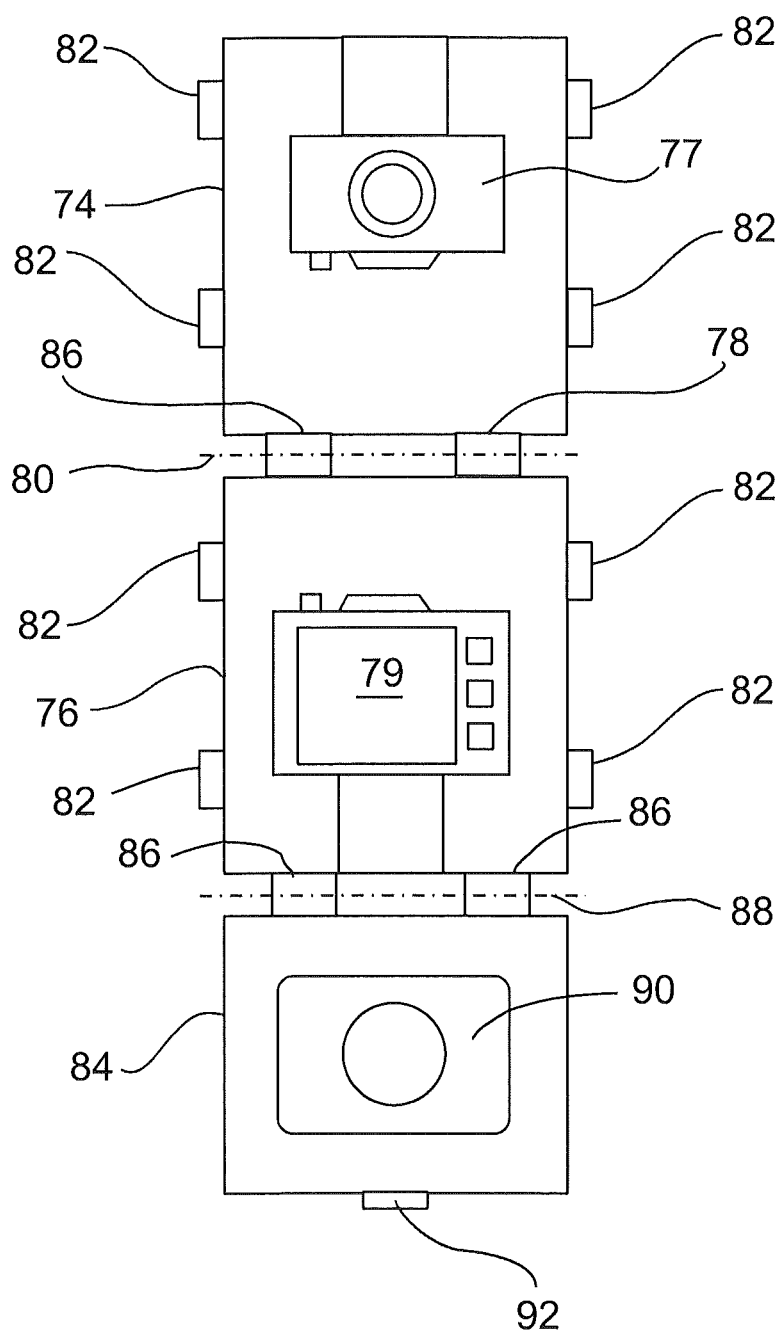

FIG. 2A-2C illustrates another case 72 according to another embodiment of the invention. In this embodiment, the case 72 includes a first housing 74 rotationally coupled to a second housing 76 by hinges 78 about a first axis 80. The first housing 74 and second housing 76 are constructed in a substantially similar manner to the first housing 22 and second housing 24 with a shell, an insert member, and an open end as described above. The first housing 74 and second housing 76 further include recesses 77, 79 sized, contoured and shaped to receive the device to be protected and transported. The first housing 74 and the second housing 76 are coupled by latch members 82 in when the case is in the closed position.

The case 72 includes a third housing 84 rotationally coupled by hinges 86 to the second housing 76 about a second axis 88. In this embodiment, the second axis 88 is substantially parallel to the first axis 80. The third housing 84 is constructed substantially similarly to the third housing 28 having a shell and an insert member with a recess 90. The third housing 84 is retained to the first housing 74 by a latch member 92.

Those skilled in the art will appreciate that the case of the present invention need not be limited to any particular shape, and rather, the shape could be dictated by the device that is to be stored within, or other considerations such as the environment in which the case will be stored and transported. Likewise, the housings need not be oriented as set forth in the disclosed embodiments, and the housings need not be permanently coupled in a rotational manner as disclosed. Those skilled in the art will recognize other attachment mechanisms and arrangements, including removable attachment arrangements that can be utilized to practice the invention. A variety of materials for the exterior and interior of the case can be utilized within the scope of the invention.

Figure 3:
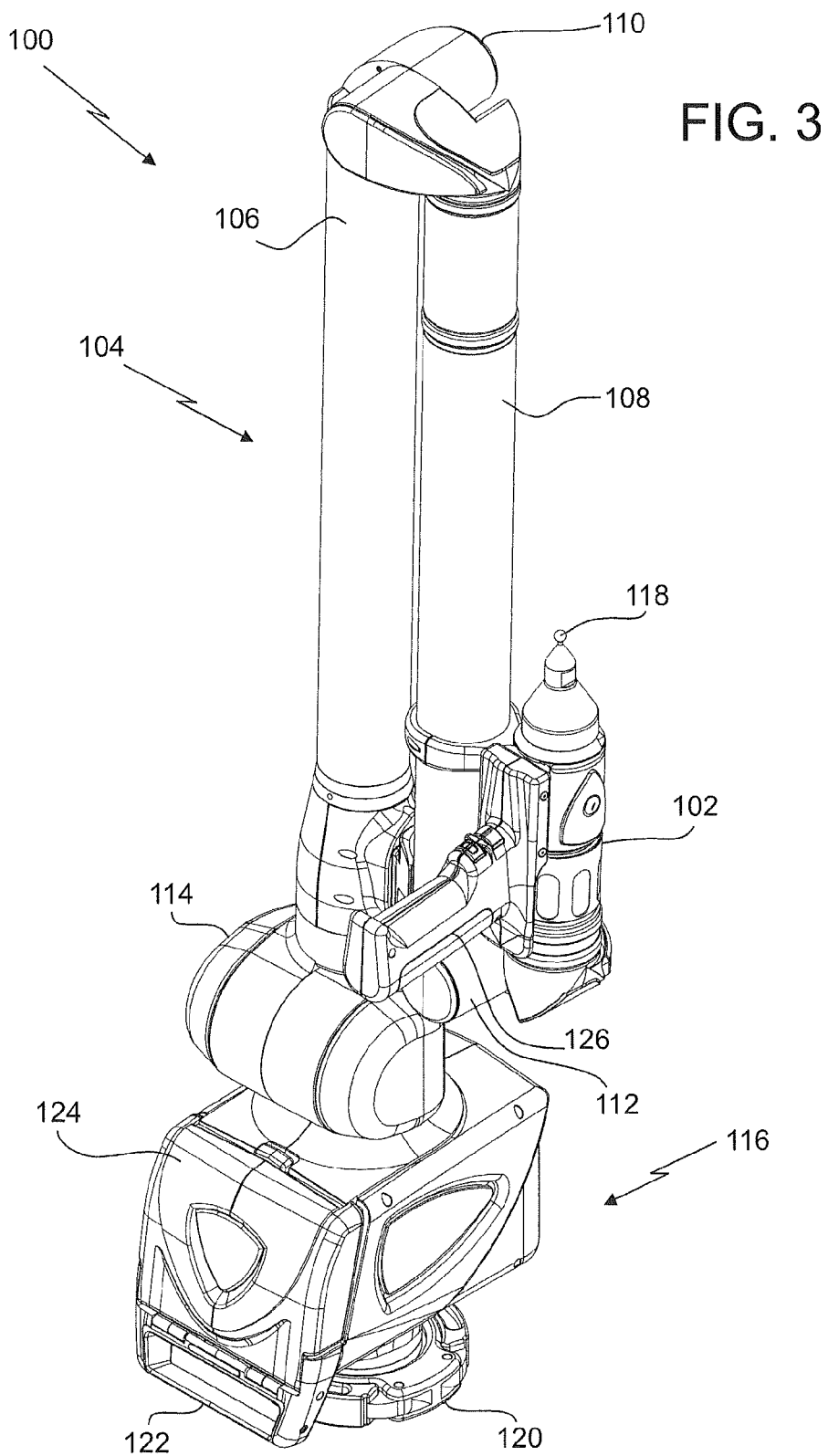
FIG. 3 is a perspective view of a metrology instrument.

One application in which the case may be utilized is with metrology instruments. FIG. 3 illustrates, in perspective, a metrology instrument, such as a portable articulated arm coordinate measuring machine (AACMM) 100, an articulated arm being one type of coordinate measuring machine. As shown in FIG. 3, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. In addition, the measurement probe housing 102 may comprise the shaft of the seventh axis portion of the AACMM 100 (e.g., a cartridge containing an encoder system that determines movement of the measurement device, for example a probe 118, in the seventh axis of the AACMM 100). In use of the AACMM 100, the base 116 is typically affixed to a work surface.

The base 116 may include an attachment device or mounting device 120. The mounting device 120 allows the AACMM 100 to be removably mounted to a desired location, such as a tripod, an inspection table, a machining center, a wall or the floor for example. In the exemplary AACM 100, the base 116 includes a handle portion 122 that provides a convenient location for the operator to hold the base 116 as the AACMM 100 is being moved. The base 116 further includes a movable cover portion 124 that folds down to reveal a user interface, such as a display screen.

It should be appreciated that it is desirable to provide some level of protection for metrology instruments, such as AACMM 100 for example, when the metrology instrument is being transported between installations or shipped from one location to another to prevent inadvertent damage or the changing of the instruments calibration. It should further be appreciated that a metrology instrument, such as the AACMM 100 for example, may be difficult to handle when not mounted to a work surface due to the weight of the device and the degrees of freedom provided by the bearing cartridge grouping 110, 112, 114 and the arm segments 106, 108.

Figure 4:
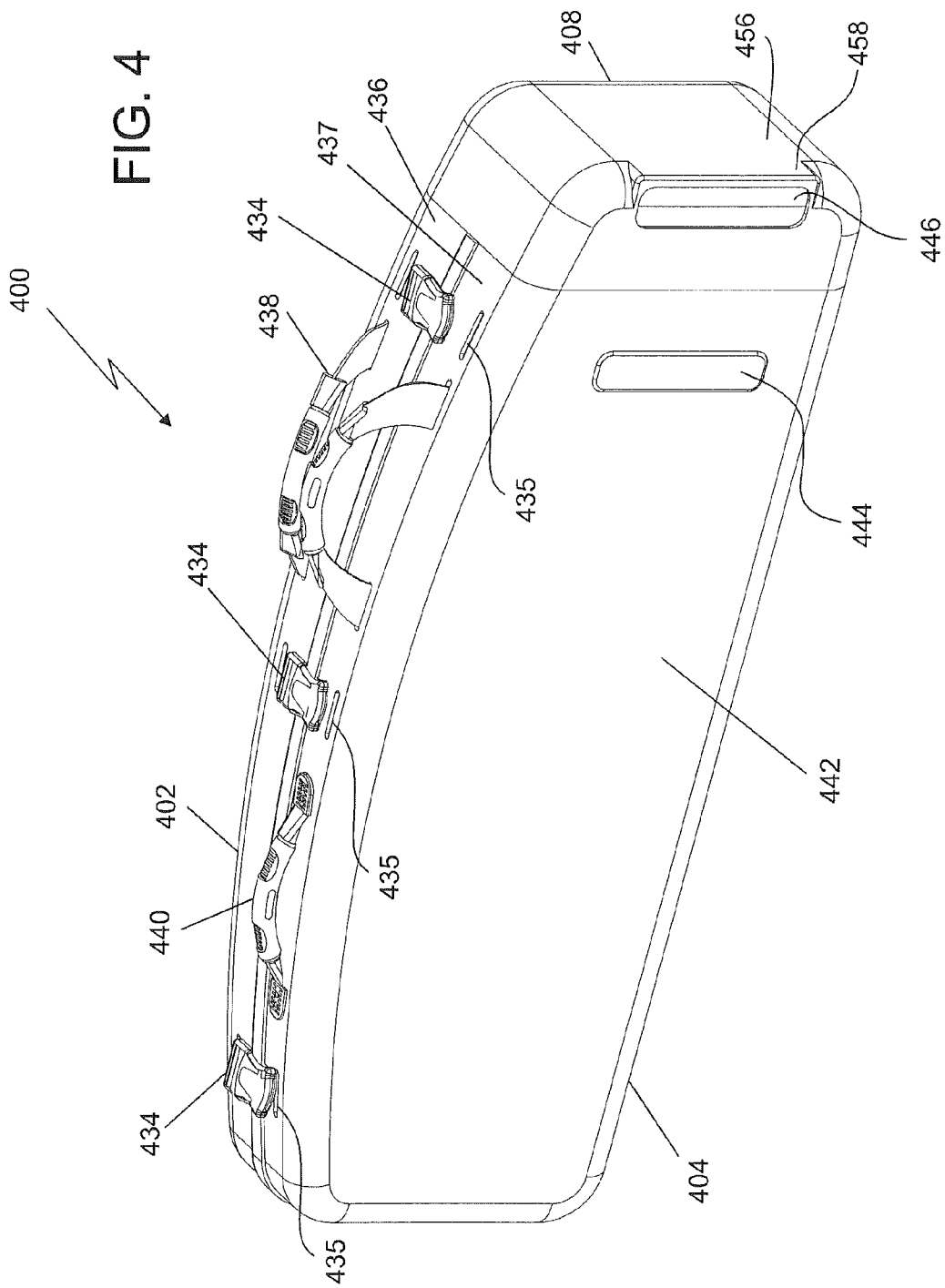
FIG. 4 is a perspective view of a case for a metrology instrument such as the AACMM of FIG. 3 in accordance with an embodiment of the invention.
Figure 5:
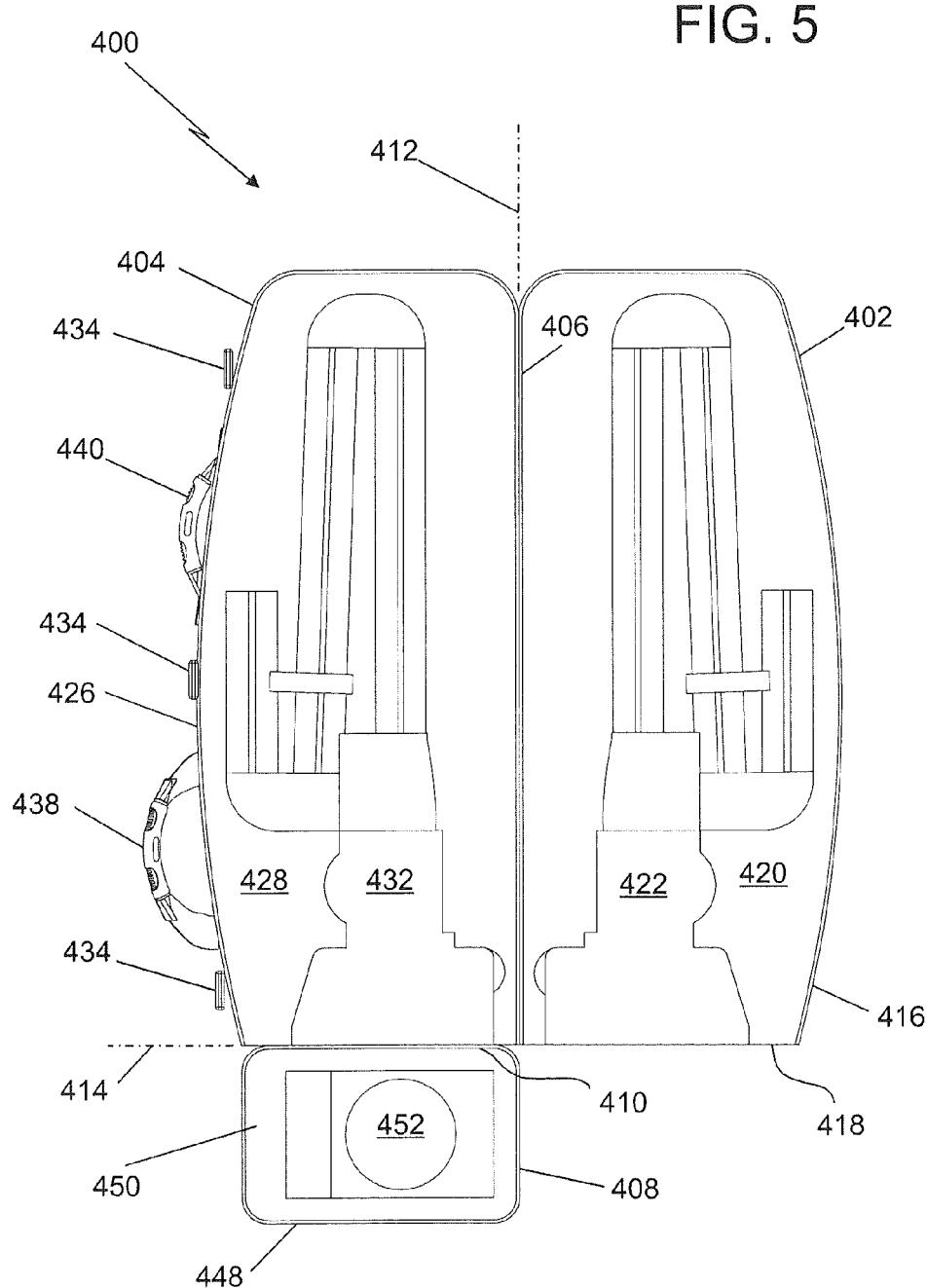
FIG. 5 is a side view of the case of FIG. 4 in an open position.

Referring to FIGS. 4-5, an embodiment of a case 400 is provided that may enclose and protect a metrology instrument, such as AACMM 100. The case 400 includes a first housing 402 rotationally coupled to a second housing 404 along an edge 406 by one or more hinges. A third housing 408 is arranged at one end of the case 400 and is rotationally coupled to the second housing 404 along an edge 410 by one or more hinges. The first housing 402 and second housing 404 are arranged to rotate about a first axis 412, while the third housing 408 rotates relative to the second housing 404 about a second axis 414. In one embodiment, the first axis 412 is substantially perpendicular to the second axis 414.

Figure 6:
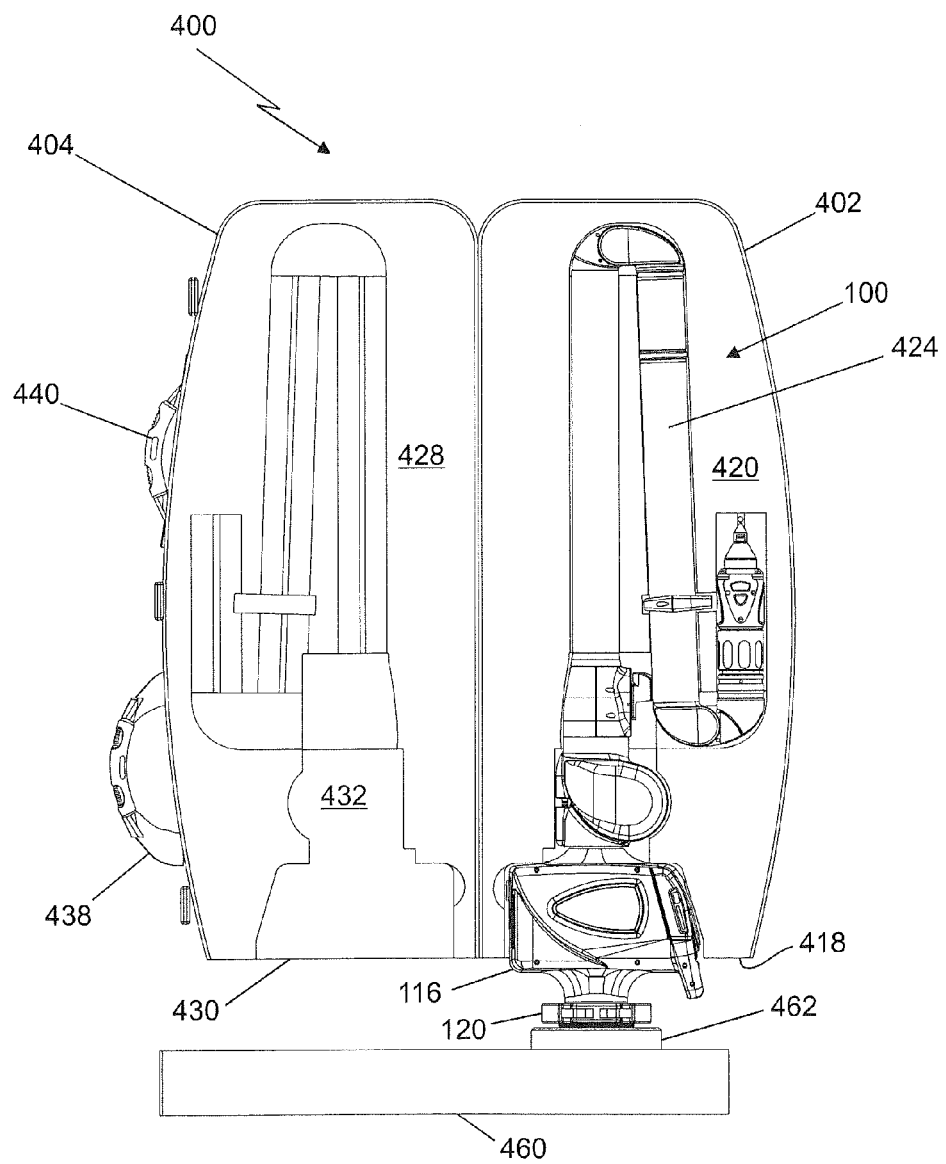
FIG. 6 is a side view of the case of FIG. 4 being positioned over an installed metrology instrument.
Figure 7:
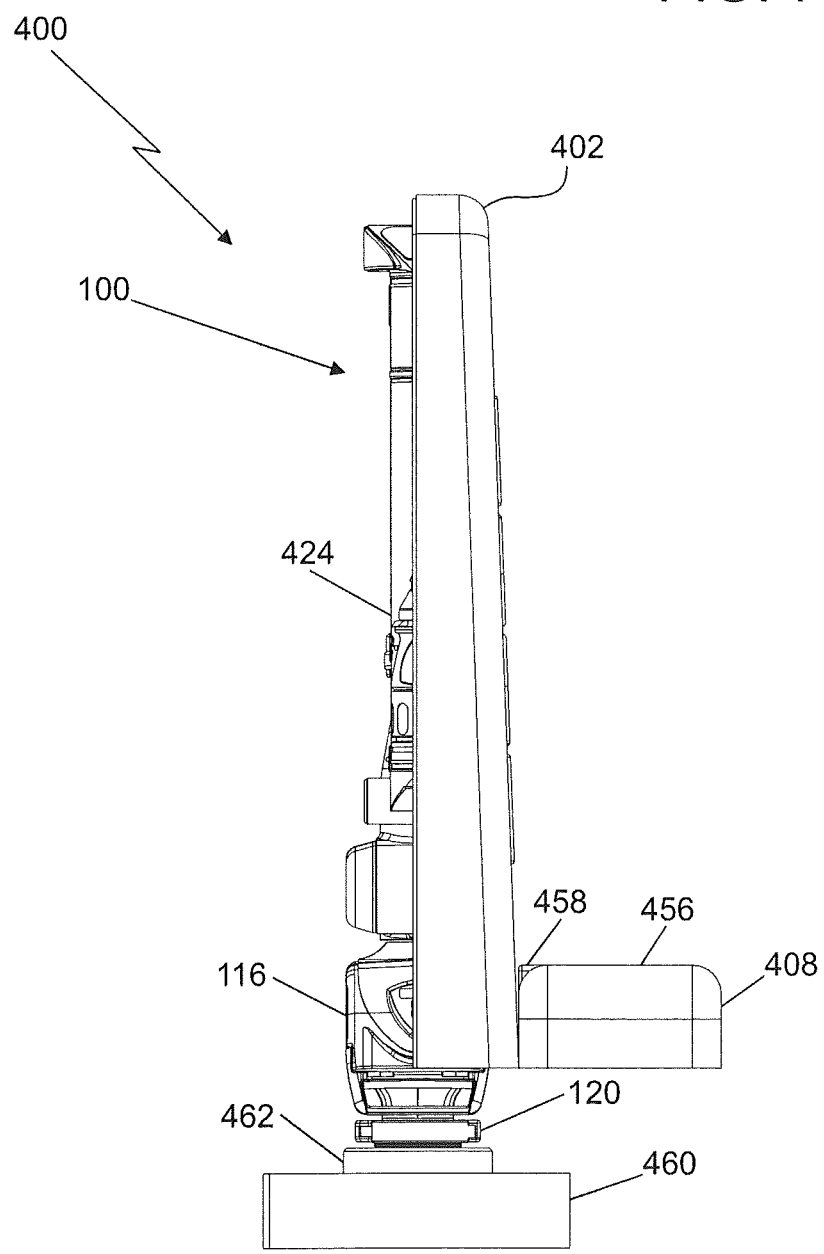
FIG. 7 is a front view of the case of FIG. 6.
Figure 8:
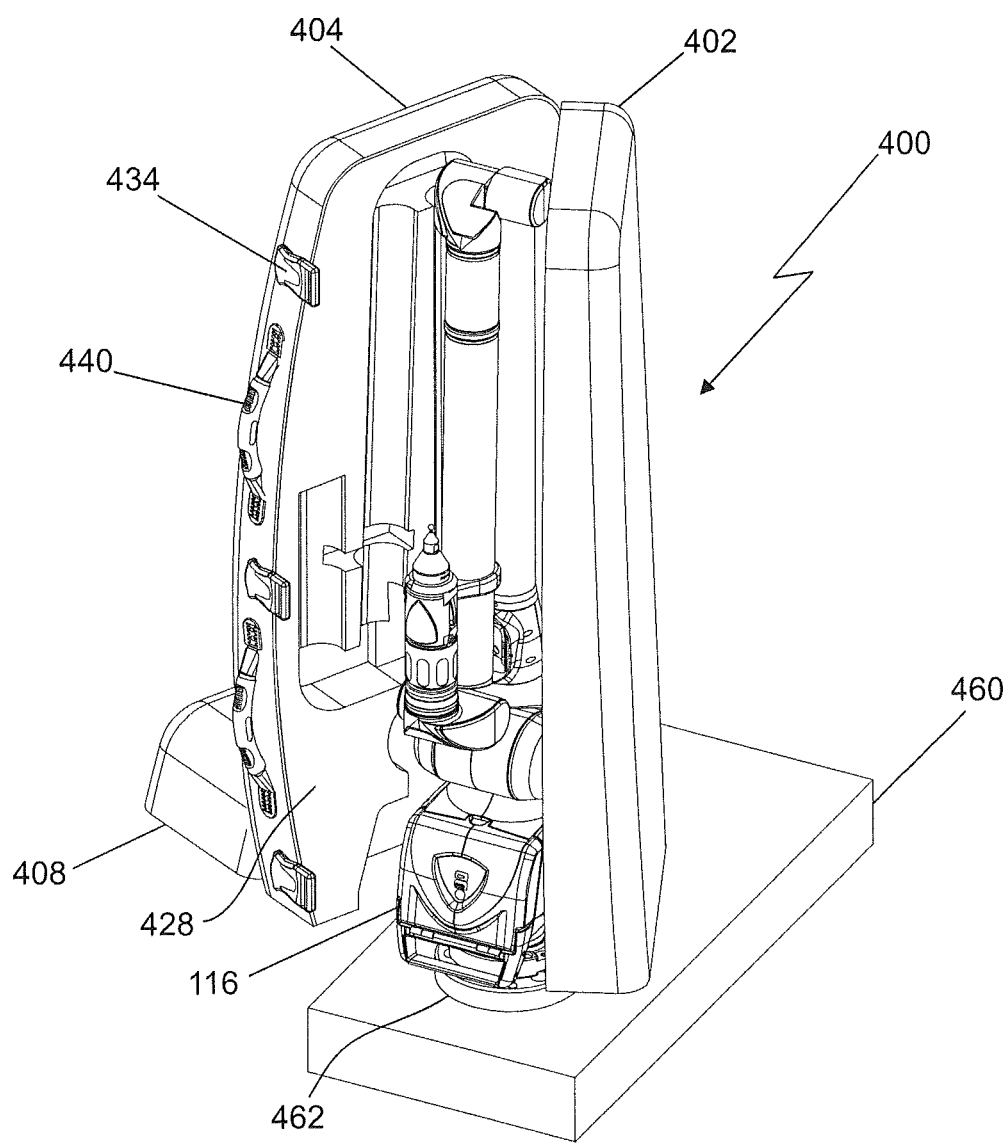
FIG. 8 is a perspective view of the case of FIG. 6.

The first housing 402 includes a shell 416 that is substantially open on one end 418. The shell 416 defines a hollow interior region that is substantially filled by an insert 420. The surface of insert 420 forms a side of the first housing 402. In one embodiment, the surface of insert 420 includes a fabric liner that is made from an electrostatic-discharge safe material. The insert 420 includes a recess 422. The recess 422 may be contoured, sized and shaped to receive a portion of the metrology instrument. In one embodiment, the recess 422 may be shaped to receive a portion 424 (FIG. 6) of the AACMM 100 of FIG. 3 wherein the recess 422 includes separate areas sized, shaped and contoured to receive the first arm segment 106, the second arm segment 108, the measurement probe housing 102 and at least part of the base 116 for example.

The second housing 404 is constructed similarly to the first housing 402 and includes a shell 426 with a substantially open end 430. An insert 428 is positioned within the shell 426 and includes a recess 432 contoured, sized and shaped to receive a portion of the metrology instrument. In one embodiment, the shell 426 includes an outer surface 442 having a member 444 arranged adjacent the end 430. In the exemplary embodiment, the member 444 is a plate positioned to cooperate with a magnet 446 disposed on the third housing 408. It should be appreciated that when the first housing 402 and the second housing 404 are rotated to a closed position, the opposing sides of the inserts 420, 428 may be in contact such that the portion 424 of the metrology instrument arranged in the recesses 422, 432 is substantially enclosed. When the metrology instrument is enclosed by the first housing 402 and the second housing 404, the metrology instrument is restrained such that there is substantially no movement of the metrology instrument within the case 400.

The first housing 402 and the second housing 404 may include one or more latch members 434 disposed along a side 436 opposite the hinges. The latch members 434 may include any suitable retaining device that securely, reliably and releasably couples the housings 402, 404 together when in the closed position. In one embodiment, the latch members 434 are an over-center draw type latch having a claw or hook member that is captured in a slot 435 disposed on the side 437 of second housing 404. The first housing 402 and second housing 404 may further include one or more handles 438, 440 that facilitate the carrying of the case 400 by an operator. In one embodiment, the handle 438 is offset from the center of the case 400 to compensate for and align with the center of gravity of the metrology instrument.

The third housing 408 is constructed similarly to the first housing 402 having a shell 448 and an insert 450. The insert 450 may include a recess 452 that is sized, shaped and contoured to receive a portion of the metrology instrument. The third housing 408 is sized such that when the third housing 408 is rotated to the closed position, the third housing 408 encloses the open ends 418, 430. As will be discussed in more detail below, when the first housing 402, the second housing 404 and the third housing 408 are rotated to a closed position, a metrology instrument may be substantially enclosed within the case 400. The case 400 may also include one or more latch members 454 (FIG. 9) that couple the third housing 408 to the first housing 402 when in the closed position.

In the exemplary embodiment, the third housing 408 includes an outer surface 456 having a projection 458. The magnetic member 446 is mounted on the projection 458. The magnetic member 446 cooperates with the plate member 444 to retain the third housing 408 in an open position. It should be appreciated that in other embodiments, the positions of plate member 444 and the magnetic member 446 may be reversed with the magnetic member 446 coupled to the surface 442 and the plate member 444 coupled to the third housing 408. In other embodiments, the magnetic member 446 and plate member 444 are replaced with a mechanical latching device.

Referring to FIGS. 6-9, a method of packing a metrology instrument, such as an AACMM 100 for example, will be described. Metrology instruments, such as AACMM 100, a laser tracker, a laser scanner, a 3D imager, a total station, a theodolite or a rotating level for example, are often mounted to a work surface 460 during operation. It should be appreciated that the work surface 460 may also include other support arrangements such as but not limited to a tripod, a free-standing fixture, a wall mounted fixture or a ceiling mounted fixture for example. The work surface 460 provides a firm and substantially rigid base of support for the metrology instrument. The metrology instrument may be attached to the working surface 460 by a fixture such as mounting device 462. The mounting device 462 may be a magnetic mounting device such as that described in commonly-owned U.S. Pat. No. 6,904,691 entitled "Portable Coordinate Measurement Machine with Improved Counter Balance" which is incorporated herein by reference. The metrology instrument may be removably coupled to the mounting device 462 such as by a threaded ring 120 for example. When the operator desires to move the metrology instrument, the threaded ring 120 is rotated to unscrew the threaded ring from the mounting device 462.

It should be appreciated that metrology instruments are often used in areas that are congested or that provide opportunities for an operator to contact the metrology instrument with other devices or equipment located in the area of installation. In the case of the AACMM 100, the handling of the AACMM 100 is further complicated by the degrees of freedom provided by bearing cartridges 110, 112, 114. One advantage of the case 400 provided herein is the capability of enclosing the metrology instrument at least partially within the case 400 prior to decoupling the metrology instrument from the mounting device 462. The ability to secure the metrology instrument within the case 400 also provides other advantages since the arm segments 106, 108 are substantially free to rotate or swing unless restrained. If an arm segment 106, 108 rotates away from an operator while being handled, the center of mass can change quickly and uncontrollably. As a result, costly damage to the metrology instrument and downtime where the instrument may not be available may occur. Since the metrology instrument is easier to manage (e.g. the arms are restrained) in the case 400, operators having a wider range of physical size may handle the installation and removal saving time and providing additional labor flexibility to the owner of the metrology instrument.

When the operator desires to move or transport a metrology instrument, the operator unlatches the third housing 408 from the first housing 402 and rotates the third housing 408 to an open position wherein the magnetic latch member 446 retains the third housing 408 open. The first housing 402 and the second housing 404 are unlatched allowing the second housing 404 to rotate away from the closed position. With the case 400 opened, the operator may then place the portion 424 of the metrology instrument into one of the recesses 422, 432. It should be appreciated that a retaining device, such as the magnetic latch 444, 446 retains the third housing 408 in the open position (FIG. 7) to reduce interference with the placement of the metrology instrument in the case 400 while still being mounted to the work surface 460. The first and second housings 402, 404 are then rotated to the closed position enclosing and capturing the metrology instrument portion 424 within the recesses 422, 432.

Figure 9:
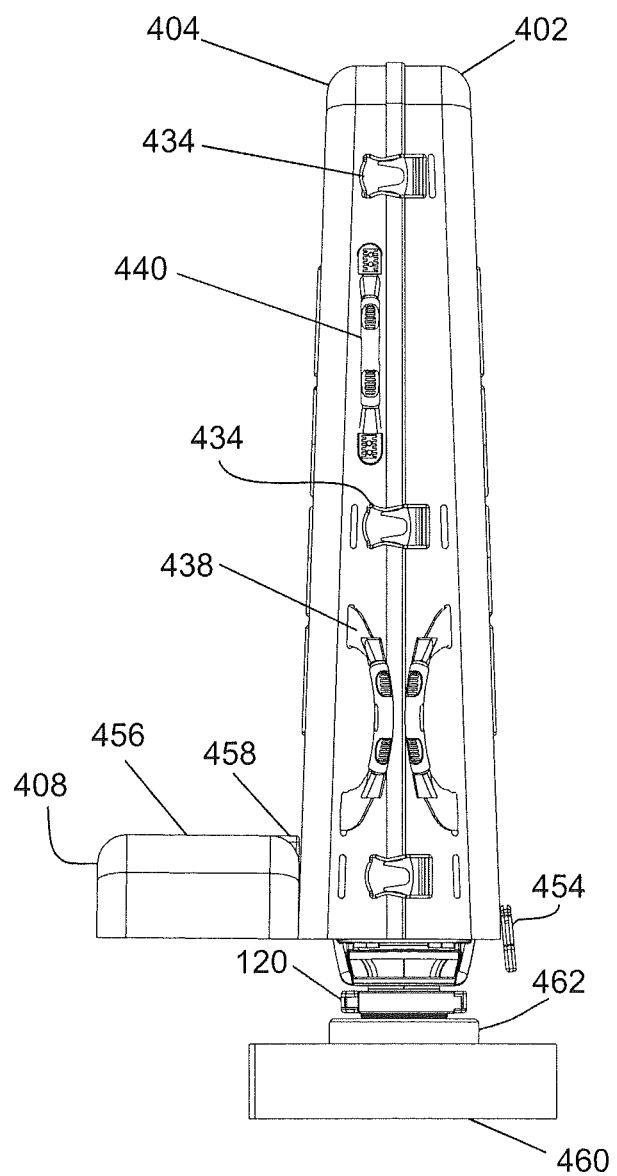
FIG. 9 is a front view of the case of FIG. 4 with a portion of the metrology instrument enclosed in the case.

Once the first housing 402 and second housing 404 are arranged in the closed position, the latch member 434 may be utilized to retain the first housing 402 and second housing 404 in the closed position (FIG. 9). With the metrology instrument portion 424 enclosed within the first housing 402 and second housing 404, the operator may decouple the metrology instrument from the work surface 460 while protecting the portion 424 from damage. After decoupling the metrology instrument the operator may move the case and device away from the mounting device 462 such as with handles 438. The operator may then release the third housing 408 from the magnetic latch 444, 446 and rotate the third housing 408 to the closed position. As the third housing 408 rotates, the remaining portion of the metrology instrument is enclosed within the recess 452. With the third housing in the closed position, the latch member 454 may be used to secure the third housing 408 to the first housing 402 allowing the operator to transport the metrology instrument within the case 400.

It should be appreciated that the method of installing the metrology instrument that is stored in the case is substantially the reverse of the above steps. To install the metrology instrument, the third housing 408 is rotated away from the metrology instrument to expose the base of the metrology instrument. The base may then be mounted to the work surface 460. With the metrology instrument securely mounted, the first housing 402 and second housing 404 are separated, allowing the case 400 to be removed from the metrology instrument.

It should further be appreciated that while the embodiment described herein references a metrology instrument, this is for exemplary purposes and the claimed invention should not be so limited. The method of installing another mounted device, such as but not limited to, a musical instrument, a still camera, a movie camera, or a telescope for example, would be substantially the same.

Figure 10:
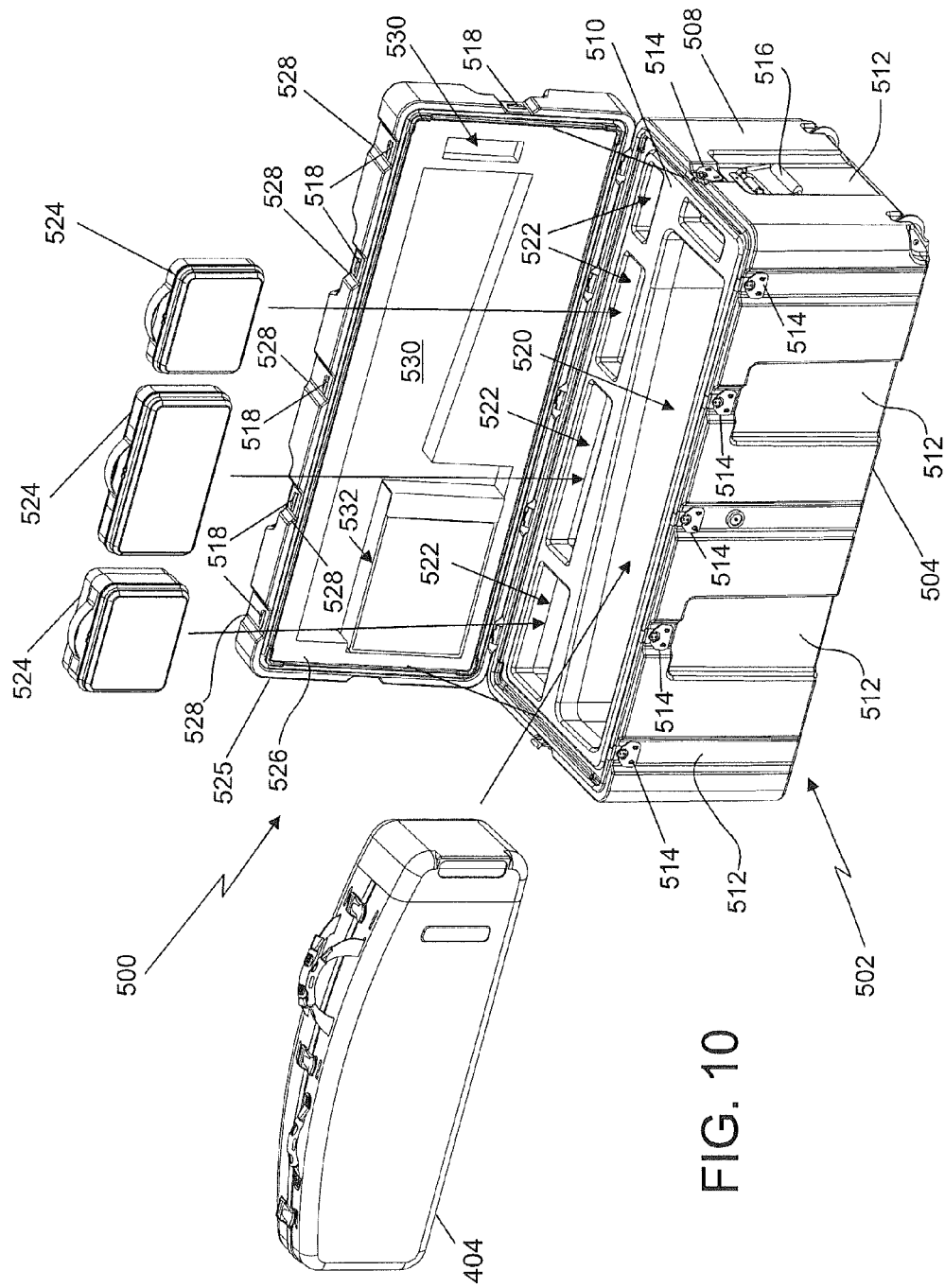
FIG. 10 is a perspective view of a case arrangement for a device in accordance with another embodiment of the invention.

In some instances, the operator may transport the device farther distances and utilize a service such as a third party shipping entity for example. In these applications, the operator may desire to additional protection for the device to prevent damage to the device during shipping. Referring to FIGS. 10-11, another embodiment of a device transportation enclosure 500 is shown. In this embodiment, the device is enclosed in an inner case 400 as described herein above. A second or outer case 502 is provided having a base 504 and a lid or cover member 506.

The base 504 has a generally parallelepiped shape with a shell portion 508 and an insert member 510. The shell portion 508 may have one or more recesses 512 disposed about its periphery. One or more latch members 514 may be disposed within the recesses 512. The latch member 514 cooperates with a corresponding member 518 or slot on the cover 506 to retain the cover 506 in the closed position during transportation. One or more handles 516 may also be arranged within the recesses 512 such as on the end of the base 504. In one embodiment, the shell portion 508 is made from a roto-molded plastic material such as a polyurethane material for example.

The insert member 510 is disposed within the shell portion 508. The insert member 510 includes one or more openings 520, 522. In the exemplary embodiment, the insert member 510 is made from an open cell polyurethane foam material. The opening 520 is sized to receive and retain the case 400. It should be appreciated that the device may have one or more accessory devices or assemblies that may be used by the operator during operation. In an embodiment where the device is a metrology instrument, the openings 522 are sized to receive one or more accessory cases 524 that contain devices and assemblies for use with the metrology instrument. The accessories may include, but are not limited to, a laser line probe, a touch probe, a bar code reader, a flashlight, a digital camera, a video camera, and a mounting device for example.

The cover member 506 is of similar construction to the base 504. The cover member 506 includes a shell portion 525 and an insert 526. In the exemplary embodiment, the shell portion 525 is made from a roto-molded polyurethane material. The shell portion 525 may have one or more recesses 528 that substantially align with the recesses 512 in base 504. In the exemplary embodiment, the insert 526 is made from an open cell polyurethane material. The insert 526 may include one or more recesses 530 that are sized to cooperate with the openings 520, 522 to support and retain cases 400, 524. In one embodiment, the insert 526 may include a pocket area 532 that is sized to receive paper documentation, user manuals and the like.

When the operator desires to ship the device, the operator inserts the device into the case 400 as described herein above. The case 400 is then inserted into the opening 520. Any accessories the operator desires to accompany the device may then be stored in the cases 524 and inserted in the openings 522. With the cases 400, 524 arranged in the base 504, the operator may close the cover member 506 and secure the outer case 502 via latch members 514. Once the cover member 506 is secured, the device is securely packed for shipping.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of transporting a device, comprising:
providing the device coupled to a mounting fixture;
providing a first case with a first housing rotationally coupled to a separate second housing, the first case further having a separate third housing rotationally coupled to an end;
rotating the first housing about a first axis relative to the second housing from a first position to a second position;
rotating the third housing about a second axis substantially perpendicular to the first axis from a third position to a fourth position;
placing a first portion of the device into the second housing, a second portion of the device having a mounting device is provided adjacent the end;
rotating the first housing from the second position to the first position to enclose the first portion of the device, with the second portion and the mounting device being outside of the first housing and second housing; and
decoupling the device from the mounting fixture when the first portion of the device is enclosed by the first housing and the second housing.

2. The method of claim 1 further comprising rotating the third housing from the fourth position to the third position to enclose the device within the first case.

3. The method of claim 2 further comprising coupling the third housing to the second housing in the fourth position.

4. The method of claim 3 further comprising a magnetic latch arranged to couple the third housing to the second housing in the fourth position.

5. The method of claim 1 further comprising providing a second case having a base portion and a lid portion, the base portion having at least one recess sized to receive the first case.

6. The method of claim 5 further comprising disposing the first case in the at least one recess after rotating the third housing from the fourth position to the third position.

7. A method of transporting a device, comprising:
providing the device enclosed in a first case, the first case having a first housing rotationally coupled to a separate second housing, the first case further having a separate third housing movably coupled to an end;
moving the third housing to expose a first portion of the device, the first portion including a mounting device;
coupling the mounting device to a mounting fixture with a second portion of the device being enclosed by the first housing and the second housing;
rotating the first housing about a first axis relative to the second housing from a first position to a second position, wherein the second portion of the device is exposed when the first housing is in the second position; and
removing the second housing from the second portion of the device.

8. The method of claim 7 wherein the third housing is rotationally coupled to the end of the first case about a second axis between a third position and a fourth position.

9. The method of claim 8 further comprising:
rotating the third housing from the fourth position to the third position to expose the first portion of the device; and
coupling the third housing to the second housing in the fourth position.

10. The method of claim 9 further comprising:
providing a second case having a base portion and a lid portion, the base portion having at least one recess sized to receive the first case; and
removing the first case from the at least one recess before rotating the third housing from the fourth position to the third position.

* * * * *